United States Patent Office 3,810,895
Patented May 14, 1974

3,810,895
SYNTHESIS OF PIPERAZINES
Stephen N. Massie, Palatine, Ill., assignor to Universal Oil Products Company, Des Plaines, Ill.
No Drawing. Filed Sept. 30, 1971, Ser. No. 185,452
Int. Cl. C07d 51/70, 51/72
U.S. Cl. 260—268 SY
6 Claims

ABSTRACT OF THE DISCLOSURE

Piperazines are prepared by reacting a glycol, and particularly a glycol containing hydroxy substituents on adjacent carbon atoms, with an amide at elevated temperatures and a pressure in the range of from atmospheric to about 300 atmospheres.

This invention relates to a process for the synthesis of heterocyclic compounds, and particularly to a process for the synthesis of piperazines.

The synthesis of piperazines utilizing certain compounds such as ethylenedibromide, hydroxy-amides or hydroxy-ethylenediamines is known in the art.

However, it has now been discovered that piperazines may be synthesized by reacting an amide with a glycol, in which the hydroxy substituents of the glycol are on adjacent carbon atoms, to form the desired product. By utilizing these materials it will be possible to prepare the desired product in a relatively inexpensive manner inasmuch as the starting materials which are utilized to prepare piperazines according to the prior art processes hereinbefore set forth are more costly than the glycols or amides. For purposes of this invention the terms "glycol" and "1,2-diol" which are used in the present specification may be used interchangeably, the latter term also referring to dihydroxy-substituted compounds in which the dihydroxy substituents are positioned on adjacent carbon atoms and therefore are not necessarily on the number 1 and number 2 carbon atoms in the chain.

The products which are synthesized according to the process of the present invention, namely, piperazines and particularly substituted piperazines, constitute useful products in the chemical industry. The piperazines, and particularly piperazine itself, are used in medicines, as corrosion inhibitors, as insecticides, etc. Derivatives of piperazine may be used as surfactants, as synthetic fibers or agricultural chemicals, as stabilizing agents, as rubber chemicals, as catalysts for polyurethane formation, etc.

It is therefore an object of this invention to provide a novel process for preparing piperazines.

A further object of this invention is to provide a novel and relatively inexpensive process for synthesizing piperazines utilizing readily available and therefore inexpensive chemicals as starting materials therefor.

In one aspect an embodiment of this invention lies in a process for the preparation of a piperazine which comprises reacting a glycol with an amide at reaction conditions which include a temperature in the range of from about 100° to about 500° C. and a pressure in the range of from about atmospheric to about 300 atmospheres, and recovering the resultant piperazine.

A specific embodiment of this invention is found in a process for the preparation of a piperazine which comprises reacting ethylene glycol with N-methylformamide at a temperature in the range of from 100° C. to about 500° C. and a pressure in the range of from about atmospheric to about 300 atmospheres, and recovering the resultant N,N'-dimethylpiperazine.

Other objects and embodiments will be found in the following further detailed description of this invention.

As hereinbefore set forth it has now been discovered that piperazines may be synthesized by reacting a dihydroxy substituted compound in which the hydroxy substituents are positioned on adjacent carbon atoms with an amide, said process being effected to reacting conditions of the type hereinbefore set forth in greater detail.

Examples of dihydroxy compounds which are referred to as glycols or as 1,2-diols will possess the generic formula

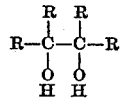

in which R is selected from the group consisting of hydrogen, alkyl, cycloalkyl, aryl, alkaryl and aralkyl radicals. Some specific examples of these 1,2-diols which may be used will include ethylene glycol,
propylene glycol,
1,2-butanediol,
2,3-butanediol,
1,2-pentanediol,
2,3-pentanediol,
1,2-hexanediol,
2,3-hexanediol,
3,4-hexanediol,
1,2-heptanediol,
2,3-heptanediol,
3,4-heptanediol,
2-methyl-2,3-butanediol,
2,3-dimethyl-2,3-butanediol,
2,3-dimethyl-2,3-pentanediol,
1-phenyl-1,2-ethanediol,
1,2-diphenyl-1,2-ethanediol,
2-phenyl-2,3-butanediol,
2-o-tolyl-2,3-butanediol,
2-m-tolyl-2,3-butanediol,
2-p-tolyl-2,3-butanediol,
2-cyclopentyl-2,3-butanediol,
2-o-tolyl-2,3-pentanediol,
2-m-tolyl-2,3-pentanediol,
2-p-tolyl-2,3-pentanediol,
2-cyclopentyl-2,3-pentanediol,
2-o-tolyl-2,3-hexanediol,
2-m-tolyl-2,3-hexanediol,
2-p-tolyl-2,3-hexanediol,
2-cyclopentyl-2,3-hexanediol, etc.

The aforementioned glycols are reacted with an amide which possessed the generic formula

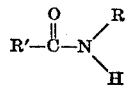

in which R and R' may be selected from the group consisting of hydrogen, alkyl, aryl, cycloalkyl, alkaryl, and aralkyl radicals. Some examples of these compounds include formamide,
N-methylformamide,
N-ethylformamide,
N-propylformamide,
N-isopropylformamide,
N-butylformamide,
N-t-butylformamide,
N-amylformamide,
acetamide,
N-methylacetamide,
N-ethylacetamide,
N-propylacetamide,
N-isopropylacetamide, N-butylacetamide,
N-t-butylacetamide,
N-amylacetamide,
N-methylbutyramide,
N-ethylbutyramide,
N-propylbutyramide,
N-isopropylbutyramide,
N-butyramide,
N-t-butylbutyramide,
N-amylbutyramide,
N-methylbenzamide,
N-ethylbenzamide,
N-propylbenzamide,
N-isopropylbenzamide,
N-butylbenzamide,
N-t-butylbenzamide,
N-amylbenzamide, etc.,
N-phenylformamide,
N-benzylformamide,
N-p-tolylformamide,
N-cyclopentylformamide,
N-cyclohexylformamide,
N-phenylacetamide (acetanilide),
N-benzylacetamide,
N-p-tolylacetamide,
N-cyclopentylacetamide,
N-cyclohexylacetamide,
N-phenylpropionamide,
N-benzylpropionamide,
N-p-tolylpropionamide,
N-cyclopentylpropionamide,
N-cyclohexylpropionamide,
N-phenylbutyramide,
N-benzylbutyramide,
N-p-tolylbutyramide,
N-cyclopentylbutyramide,
N-cyclohexylbutyramide, etc.

It is to be understood that the aforementioned amides and dihydroxy substituted compounds are only representative of the class of compounds which may be used, and therefore the process of this invention is not necessarily limited to the above listed compounds.

If so desired, the synthesis of the piperazines may be effected in the presence of certain catalytic compositions of matter, said catalyst comprises those compounds which are well known in the art as dehydration catalysts. Representative examples of these catalytic compositions of matter may include elemental metals such as nickel, and particularly the form known as Raney nickel; natural oxides such as alumina, silica, or mixtures thereof such as alumina-silica, alumina-silica-zirconia, alumina-silica-magnesia, etc., or salts such as copper chromite.

The reaction conditions which are utilized to effect the synthesis of the piperazines will include elevated temperatures in a range from about 100° up to about 500° C. or more and pressures which may be in a range of from about atmospheric up to about 300 atmospheres or more. In the event that superatmospheric pressures are to be employed these pressures may be provided for by the introduction of a substantially inert gas such as nitrogen into the reaction zone in such an amount so that the major portion of the reactants are maintained in a liquid phase. When utilizing atmospheric pressure to effect the reaction it may be desirable that the starting materials comprising the 1,2-diol and the amide are dissolved in a substantially inert organic solvent in order that reaction may be allowed to proceed at the reflux temperature of the solvent, the water which is formed as a by-product of the reaction being removed by means of azeotropic distillation. Specific examples of these substantially inert organic solvents will preferably comprise aromatic solvents such as benzene, toluene, the xylenes, ethylbenzene, etc. In addition, it is also contemplated that the employment of a catalytic composition of matter of the type hereinbefore set forth in greater detail will also permit the reaction to be effected at a temperature in the lower portion of the range also hereinbefore set forth. However, it is also possible to effect the synthesis reaction of the present process in a thermal manner by utilizing temperatures in the upper portion of the aforesaid temperature range, that is, by employing temperatures ranging from about 300° to about 500° C.

The process of the present invention may be effected in any suitable manner and may comprise either a batch or continuous type operation. For example, when a batch type operation is used as quantity of the starting materials comprising the particular amide and the particular glycol are charged to an appropriate apparatus which may comprise a reaction flask provided with heating and refluxing means if the reaction is to be effected at atmospheric pressure, or an autoclave of the reacting or mixing type if the mixing is to be effected at superatmospheric pressures. If so desired, the dehydration catalyst, if one is to be employed, is also placed in the apparatus. In the event that an autoclave is employed as the reaction apparatus, the autoclave is sealed and an inert gas such as nitrogen is pressed in until the initial operating pressure is reached, following which the autoclave and contents thereof are then heated to the desired operating temperature. The apparatus is maintained at the desired levels of temperature and pressure for a predetermined residence time which may range from about 0.1 to about 20 hours or more in duration. At the end of the reaction time the apparatus and contents thereof are allowed to return to room temperature, the excess pressure is vented or discharged and the apparatus is opened. The reaction mixture is recovered and the organic layer is separated from the water layer by conventional means following which the organic layer is then subjected to further conventional means of purification and separation, said means including extraction, washing, drying, fractional distillation, fractional crystallization, etc. whereby the desired product comprising a piperazine is separated and recovered. Conversely, when operating the reaction at atmospheric pressure the water which is formed as a by-product of the reaction is, as hereinbefore set forth, usually removed by azeotropic distillation and therefore the step of separating the water layer from the organic layer when utilizing this type of reaction is omitted in the separation and purification steps prior to recovery of the desired piperazine.

It is also contemplated within the scope of this invention that the synthesis of a piperazine may also be effected in a continuous manner of operation. One such example of a continuous type operation is to charge the starting materials comprising the glycol and the amide to a reaction vessel which is maintained at the proper operating conditions of temperature and pressure and which may, if so desired, contain a catalyst of the type hereinbefore set forth in greater detail. Although the starting materials may be charged to the reactor by separate lines, it is also possible, in an alternative method of operation, to admix the reactants prior to entry into said reaction zone, or to dissolve them in an appropriate solvent, and charge the mixture to the reactor in a single stream. Upon completion of the desired residence time in the reaction zone, the reactor effluent is continuously withdrawn and subjected to conventional means of operation whereby the desired product comprising the particular piperazine is recovered while the unreacted starting materials comprising the glycol and the amide are recycled to form a portion of the feed stock.

Some specific examples of piperazines which may be prepared or synthesized according to the process of this invention will include N,N'-dimethylpiperazine,
N,N'-diethylpiperazine,
N,N'-dipropylpiperazine,
N,N'-diisopropylpiperazine,
N,N'-di-n-butylpiperazine, N,N'-di-t-butylpiperazine,
N,N'-di-n-amylpiperazine,
N,N'-diphenylpiperazine,
N,N'-di-o-tolylpiperazine,
N,N'-di-m-tolylpiperazine,
N,N'-di-p-tolylpiperazine,
N,N'-dicyclopentylpiperazine,
N,N'-dicyclohexylpiperazine,
N,N'-dibenzylpiperazine,
2,5-dimethylpiperazine,
2,5-diethylpiperazine,
2,5-di-n-propylpiperazine,
2,5-diisopropylpiperazine,
2,5-diphenylpiperazine,
2,5-di-p-tolylpiperazine,
2,5-dibenzylpiperazine,
2,5-dicyclopentylpiperazine,
2,6-dimethylpiperazine,
2,6-diethylpiperazine,
2,6-di-n-propylpiperazine,
2,6-di-t-butylpiperazine,
2,6-di-sec-amylpiperazine,
2,6-diphenylpiperazine,
2,6-di-m-tolylpiperazine,
2,6-di-o-ethylphenylpiperazine,
2,6-dicyclohexylpiperazine,
2,3,5,6-tetramethylpiperazine,
2,3,5,6-tetraethylpiperazine,
2,3,5,6-tetra-n-propylpiperazine,
2,3,5,6-tetraisopropylpiperazine,
2,3,5,6-tetra-t-butylpiperazine,
2,3,5,6-tetra-n-amylpiperazine,
2,3,5,6-tetraphenylpiperaizne,
2,3,5,6-tetra-p-tolylpiperazine,
2,3,5,6-tetrabenzylpiperazine,
2,3,5,6-tetracyclohexylpiperazine, etc.

It is to be understood that the aforementioned piperazines are only representative of the class of compounds which may be prepared, and that the process of the present invention is not necessarily limited thereto.

The following examples are given to illustrate the processes of the present invention, which, however, are not intended to limit the generally broad scope of the present invention in strict accordance therewith.

EXAMPLE I

In this example 1.0 mol of N-methylformamide and 1.0 mol of ethylene glycol were charged to a glass liner of a rotating autoclave. The liner was sealed into the autoclave and flushed with nitrogen. Following the flushing operation additional nitrogen was pressed in until an initial operating pressure of 100 atmospheres was reached. Following this the autoclave was rotated while being heated to a temperature of 350° C. The autoclave was maintained at this temperature for a period of 2 hours during which time a maximum pressure of 268 atmospheres was observed. At the end of the aforementioned 2 hour period heating was discontinued and the autoclave and contents thereof were allowed to return to room temperature, the excess pressure was vented, the autoclave was opened and the reaction mixture was recovered therefrom. The crude mixture was examined by means of gas chromatography and was determined to contain N,N'-dimethylpiperazine by comparison of retention times with an authentic sample.

The above experiment was repeated and the crude mixture which was recovered after identical operating conditions was treated with 200% by volume of diethyl ether prior to being stirred with granular anhydrous potassium carbonate. An additional amount of potassium carbonate was added until the gas chromatograph indicated that polar components such as water and carboxylic acid had been removed. The treated solution was subjected to a fractionation and the subject portion having a boiling point of 130.5 to 132° C. comprising N,N'-dimethylpiperazine was recovered. The boiling point of N,N'-dimethylpiperazine according to the literature is 131–132° C. The identity of the N,N'-dimethylpiperazine was confirmed by infra-red spectroscopy.

EXAMPLE II

In this example a mixture comprising 1.0 mol of ethylene glycol and 1.0 mol of N-ethylformamide is placed in the glass liner of a rotating autoclave which is thereafter sealed into the autoclave. Nitrogen is pressed in until an initial operating pressure of 100 atmospheres is reached and thereafter the autoclave is heated to a temperature of 350° C. The reaction is effected at this temperature for a period of 2 hours following which heating is discontinued, the autoclave and contents thereof are allowed to return to room temperature, the excess pressure is discharged and the autoclave is opened. The reaction product is recovered and treated in a manner similar to that set forth in Example I set forth above, that is by being extracted with diethyl ether and stirred with potassium carbonate. The treated solution is subjected to fractional distillation whereby the desired product comprising N,N'-diethylpiperazine is recovered.

EXAMPLE III

A charged stock comprising 1.0 mol of ethylene glycol and 1.0 mol of N-phenylacetamide (acetanilide) is dissolved in mixed xylenes and the solution is placed in an alkylation flask which is provided with refluxing means and a Dean-Stark water trap. The mixture is heated to reflux and maintained thereat for a period of 48 hours, the water of reaction being continuously removed by means of the water trap. At the end of the 48-hour period heating is discontinued and the reaction mixture is recovered. After treatments similar to that as set forth in Example II above, the treated reaction product is subjected to fractional distillation under reduced pressure whereby the desired product comprising N,N'-diphenylpiperazine is recovered.

EXAMPLE IV

A mixture of 1.0 mol of 1,2-propanediol and 1.0 mol of N-methylacetamide is placed in the glass liner of a rotating autoclave which is sealed. Following the sealing of the autoclave nitrogen is pressed in until an initial operating pressure of 100 atmospheres is reached and thereafter the autoclave is heated to a temperature of 300° C. The autoclave is maintained at this temperature for a period of 6 hours following which heating is discontinued. The autoclave and contents thereof are allowed to return to room temperature, the excess pressure is discharged, the autoclave is opened, and the reaction mixture is recovered therefrom. After treatment by extraction with an ether and neutralizing and drying with potassium carbonate, the desired product comprising a mixture of 1,2,4,6-tetramethylpiperazine and 1,2,4,5-tetramethylpiperazine is recovered by fractional distillation.

EXAMPLE V

To the glass liner of a rotating autoclave is charged a mixture of 1.0 mol of 2,3-butanediol and 1.0 mol of N-methylformamide. In addition the autoclave will also contain 5 g. of Raney nickel. The autoclave is sealed and purged with nitrogen following which an additional amount of nitrogen is pressed in until an initial operating pressure of 110 atmospheres is reached. The autoclave is then heated to a temperature of 250° C. and maintained thereat for a period of 6 hours. Following the 6-hour period heating is discontinued, the autoclave is allowed to return to room temperature, and the excess pressure is discharged. The autoclave is opened and the mixture is subjected to fractional distillation at atmospheric pressure whereby the water which is formed during the reaction is removed. The remaining organic mixture is then treated in a manner similar to that set forth in the above examples and thereafter subjected to an additional distillation step under reduced pressure whereby the desired product comprising 1,2,3,4,5,6-hexamethylpiperazine is recovered.

EXAMPLE VI

In this example a mixture of 1.0 mol of formamide and 1.0 mol of 2,3-dimethyl-2,3-butanediol are placed in a glass liner of a rotating autoclave. The autoclave is sealed and nitrogen is pressed in until an initial operating pressure of 100 atmospheres is reached. Thereafter, the autoclave is heated to a temperature of 450° C. and maintained thereat for a period of 6 hours. At the end of this 6-hour period heating is discontinued, the autoclave and contents thereof are allowed to return to room temperature and the excess pressure is discharged. The autoclave is opened and the reaction mixture is recovered therefrom. After treatment by extraction with an ether and neutralizing and drying with potassium carbonate the desired product comprising 2,2,3,3,5,5,6,6-octamethylpiperazine is recovered by fractional distillation.

I claim as my invention:

1. A process for the preparation of a piperazine which comprises the step of reacting an amide possessing the generic formula

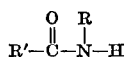

in which R and R' are selected from the group consisting of hydrogen, $C_1$–$C_5$ alkyl, phenyl, $C_5$ and $C_6$ cycloalkyl, tolyl and benzyl and a glycol possessing the generic formula

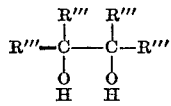

in which R''' is selected from the group consisting of hydrogen, $C_1$–$C_5$ alkyl, phenyl, $C_5$ and $C_6$ cycloalkyl, tolyl and benzyl at a temperature in the range of from about 100° to about 500° C. and a pressure in the range of from about atmospheric to about 300 atmospheres, and recovering the resulting piperazine.

2. The process as set forth in claim 1 in which said glycol is ethylene glycol, said amide is N-methylformamide and said piperazine is N,N'-dimethylpiperazine.

3. The process as set forth in claim 1 in which said glycol is ethylene glycol, said amide is N-ethylformamide and said piperazine is N,N'-diethylpiperazine.

4. The process as set forth in claim 1 in which said glycol is ethylene glycol, said amide is N-phenylacetamide and said piperazine is N,N'-diphenylpiperazine.

5. The process as set forth in claim 1 in which said glycol is 1,2-propanediol, said amide is N-methylformamide and said piperazine is 1,2,4,6-tetramethylpiperazine and 1,2,4,5-tetramethylpiperazine.

6. The process as set forth in claim 1 in which said glycol is 2,3-butanediol, said amide is N-methylformamide and said piperazine is 1,2,3,4,5,6-hexamethylpiperazine.

References Cited

UNITED STATES PATENTS

| | | | |
|---|---|---|---|
| 2,526,757 | 10/1950 | Larson | 260—309.9 |
| 2,868,791 | 1/1959 | Steele | 260—268 SY |
| 3,120,524 | 2/1964 | Godfrey | 260—268 SY |
| 3,365,454 | 1/1968 | Ferguson | 260—268 C |
| 2,605,263 | 7/1952 | Culver | 260—268 SY |
| 2,813,869 | 11/1957 | Langdon | 260—268 H |

FOREIGN PATENTS

| | | | |
|---|---|---|---|
| 921,326 | 3/1963 | Great Britain | 260—268 |

DONALD G. DAUS, Primary Examiner

U.S. Cl. X.R.

260—268 PH, 268 R, 561 R, 562 R, 617 R, 618 R, 635 R